United States Patent

Back

[11] 4,203,634
[45] May 20, 1980

[54] SEAL AND LOCKING ARRANGEMENT FOR A BEARING ASSEMBLY

[75] Inventor: Horst Back, Gochsheim, Fed. Rep. of Germany

[73] Assignee: SKF Kugellagerfabriken GmbH, Schweinfurt, Fed. Rep. of Germany

[21] Appl. No.: 878,157

[22] Filed: Feb. 15, 1978

[30] Foreign Application Priority Data

Feb. 17, 1977 [DE] Fed. Rep. of Germany ... 7704724[U]

[51] Int. Cl.² ............................................. F16C 33/78
[52] U.S. Cl. ............................ 308/187.2; 308/207 R; 308/216
[58] Field of Search ..................... 308/187, 202, 187.1, 308/187.2, 196, 194, 184, 207, 189, 190, 191, 208, 210, 216, 26, 236, 206; 277/94

[56] References Cited

U.S. PATENT DOCUMENTS

| | | | |
|---|---|---|---|
| 3,449,024 | 6/1969 | Lichte | 308/187.1 X |
| 3,958,847 | 5/1976 | Cain et al. | 308/196 |
| 3,986,754 | 10/1976 | Torrant | 308/196 |

*Primary Examiner*—Douglas C. Butler
*Attorney, Agent, or Firm*—Eugene E. Renz, Jr.

[57] ABSTRACT

A rolling bearing assembly capable of withstanding large vibrations especially adapted for use in heavy construction equipment such as steam rollers. The assembly comprises inner and outer rings, one of which is detachable or removable. The rings have guide flanges adjacent opposite ends on either side of the space for the rolling elements. A groove for an O-ring is formed in at least one of the confronting surfaces of the guide flanges. The groove is preferably the same or greater cross section as the cross section of the elastic O-rings positioned with initial stress between the surfaces.

2 Claims, 1 Drawing Figure

SEAL AND LOCKING ARRANGEMENT FOR A BEARING ASSEMBLY

BACKGROUND OF THE INVENTION

The present invention relates to bearing assemblies and more specifically to a cylindrical roller or needle bearing. The bearing is characterized by novel features of construction and arrangement whereby it is capable of withstanding extreme vibration and thereby it is particularly adapted for use in heavy construction equipment such as steam rollers.

These bearings usually comprise a detachable or removeable bearing ring and guide flanges on the inner and outer rings having confronting spaced apart circumferentially extending surfaces defining a ring gap. The inner and outer rings are supported as a bearing unit between the casing or housing welded to the frame of the steam roller and on the hub of the roller itself by suitable means.

In some prior assemblies, slots for snap rings which extend outwardly are provided in the sleeve or bore surface of the guide flange of a bearing ring, the slots having a depth of nearly the full cross sectional height of the snap ring and a greater width than the latter. These bearings are usually packed with grease and one of the difficulties is to retain the grease by reason of the fact that the bearing assembly is subjected to extreme vibrations, it has been found that grease escapes or is thrown out between the comparatively wide annular slots between the sleeve and the bore surfaces of the guide flange as well as between the snap rings extending to the outside and the circumferential slots. This of course necessitates frequent packing of the bearing and if this is not done the bearing soon deteriorates, fails and requires replacement.

In accordance with another prior known cylindrical roller bearing or needle bearing, a set of lamellar rings and rubber gaskets are joined in tandem in a circumferential slot near the raceway of the inner ring. This assembly is rather expensive to manufacture and somewhat complicated to assemble by reason of the many individual parts. Moreover this bearing arrangement is comparatively wide and yet has only a relatively small bearing strength or capacity.

SUMMARY OF THE INVENTION

The present invention provides a cylindrical roller or needle bearing assembly which consists of comparatively few parts which are simple and economical to manufacture and assemble and which even under extreme operating conditions involving high vibration loads will reliably seal. More specifically in the bearing assembly of the present invention, the guide flanges of the removeable bearing rings are of a predetermined configuration to define circular grooves for mounting an O-ring at opposite axial ends of the assembly. The groove is preferably designed so that its cross section is the same or greater than the cross section of the elastic O-ring when seated therein under stress between the two opposing guide flanges.

In accordance with another feature of the invention, the circumferentially extending axial surface of the guide flange which faces the groove has a circular recess of slight depth whereby the recess facing the rolling elements is designed so that it is open.

BRIEF DESCRIPTION OF THE DRAWING

These and other objects and the various features and details of the operation and construction of a bearing assembly in accordance with the present invention are more fully set forth hereinafter with reference to the accompanying drawings, wherein.

BRIEF DESCRIPTION OF A PREFERRED EMBODIMENT

Figure 1:
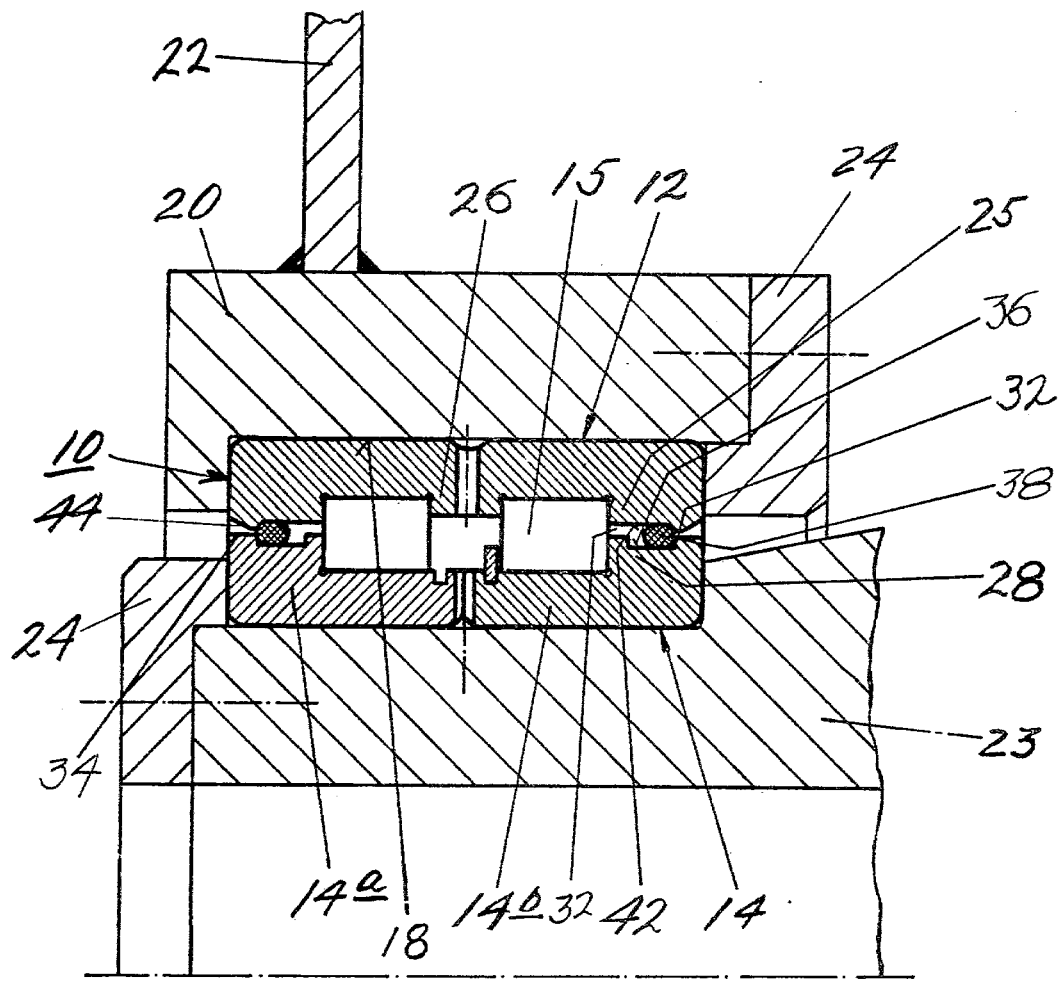
FIG. 1 is a longitudinal cross sectional view of a bearing assembly in accordance with the present invention of a drive bearing for heavy duty apparatus such as a steam roller constructed in accordance with the present invention.

Referring now to the drawing, the bearing assembly made in accordance with the present invention is generally designated by the numeral 10 and in the present instance is the drive bearing for the roller of a steam roller. The bearing as illustrated is a double row cylindrical roller bearing comprising an outer ring 12, an inner ring 14 consisting of two L-shaped segments 14a, 14b and two rows of rollers 15 in the annular space between the rings. In the present instance the outer ring is mounted in the bore 18 of a casing 20 welded to the frame 22 of the steam roller and the inner ring seats on a hub 23 suitably connected to the roller. Retaining rings 24 at one axial end of the casing and the opposite axial end of the hub hold the bearing in place. These rings as is conventional are secured by bolts or the like to the casing and hub respectively.

Considering now the bearing assembly in more detail the outer ring 12 has a pair of radially inwardly directed circumferentially extending guide flanges 25 at opposite axial ends of the outer ring and a central guide flange 26 separating the outer raceways formed in the outer ring. The inner ring also has a pair of radially outwardly directed circumferentially extending guide flanges 28 at opposing ends of the L-shaped segments and in the present instance the rolling elements 15 are guided in the raceways without a cage. The outer confronting surfaces of the guide flanges 25 and 28 are closely spaced to define narrow annular sealing gaps 32. Further, the axial circumferentially extending surface or face 34 of the inner ring guide flanges is provided with a recess in the form of a circumferential groove 36 defining a seat for an O-ring 38 made of an elastic material, e.g. a plastic or rubber. The circumferentially extending groove 36 as illustrated has a greater axial cross sectional dimension than the cross section of the O-ring 38 so that upon insertion of the L-shaped segments 14a, 14b of the inner ring in the outer ring with the rolling elements assembled therein, the O-ring 38 can be pressed into the groove. Thus the sealing gaps 32 can be designed of relatively small size. By this arrangement as soon as the L-shaped segments 14a, 14b of the inner ring have attained their normal position, the O-rings 38 expand and engage with an initial stress a circumferentially extending recess 42 in the outer ring confronting the groove in the inner ring and lock in position in an axial direction the L-shaped segments of the inner ring. The recess 42 in the outer ring flange is defined by a radially inwardly directed rib 44 which in the assembled bearing overlies the land surface of the guide flange 25 outboard of the groove 36 and also defines the narrowest portion of the sealing gap 32. The recess 42 is of a shallower radial depth than the groove 36 and is open in a direction toward the rolling elements. At the same time the O-rings 38 together with the sealing gaps 32 serve to seal the bearings against infiltration of foreign matter such as dirt, water and the like. The seal also reliably acts to prevent grease or lubricant from being discharged from the bearing as a result of the vibration loads to which the assembly is subjected. The bearing thus is permanently greased and the L-shaped segments 14a, 14b of the inner ring 14 are securely locked in place in the bearing. Disassembly of the bearing is nevertheless possible since the L-shaped segments 14a, 14b of the inner ring 14 can be removed from the bearing by pressing together the elastic O-rings 38.

While a particular embodiment of the present invention has been illustrated and described herein, it is not intended to limit the invention and changes and modifications may be made therein within the scope of the following claims.

For example, the invention has application to single row cylindrical rolling bearings or needle bearings with outer and inner rings disposed transverse to the direction of the axis.

I claim:

1. A bearing assembly comprising inner and outer rings spaced apart to define an annular space for a plurality of rolling elements, at least one of the rings having a radially directed circumferentially extending first guide flange adjacent outer axial ends, each of said flanges having a circumferential surface confronting a circumferential surface of said other ring, means defining a circumferentially extending closed groove in the circumferential surface of said first flanges for an O-ring made of an elastic material, said other ring having a circumferentially extending second guide flange and means defining a recess in the surface confronting the groove in said first guide flange, said recess being of a shallower radial depth than said groove and open in a direction toward the rolling elements, said O-ring engaging confronting surfaces of said groove and recess in the assembled position, said recess defined by a rib outboard of said recess spaced closely from said first guide flange, the outboard surface defining said rib being conical and outwardly divergent, the axial cross sectional area of said groove being at least as great as the cross sectional area of said O-ring in a compressed condition to facilitate assembly and disassembly of the rings with the O-ring in place.

2. A bearing assembly as claimed in claim 1 wherein said bearing assembly comprises two rows of rolling elements and wherein said outer ring is a one-piece member having a pair of raceways for each of the rows of rolling elements and said inner ring comprises a pair of L-shaped segments each having a raceway for one of the rows of rolling elements.

* * * * *